July 5, 1966  M. J. WRIGHT  3,259,834
VOLTAGE STABILISERS
Filed Oct. 29, 1962

United States Patent Office 3,259,834
Patented July 5, 1966

3,259,834
VOLTAGE STABILISERS
Maurice James Wright, Harborne, Birmingham, England, assignor to Joseph Lucas (Industries) Limited, Birmingham, England
Filed Oct. 29, 1962, Ser. No. 233,628
Claims priority, application Great Britain, Nov. 1, 1961, 39,065/61
13 Claims. (Cl. 323—22)

The object of this invention is to provide a convenient circuit for stabilising a D.C. voltage supply.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property, a convenient method of manufacturing a switchable rectifier being described in pending application No. 211,674, filed July 23, 1962, now Patent No. 3,223,560.

A circuit in accordance with the invention comprises a pair of input terminals adapted for connection to the unstabilised supply, a pair of output terminals adapted for connection to a load, a capacitor connected across the output terminals, a switchable rectifier through which in use current flows to charge the capacitor, and means for switching the switchable rectifier on and off for periods of time dependent on the output voltage.

Figure 1:
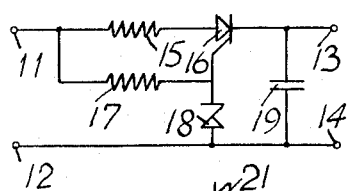
Figure 2:
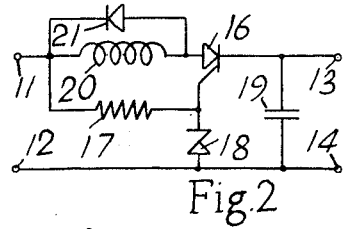
Figure 3:
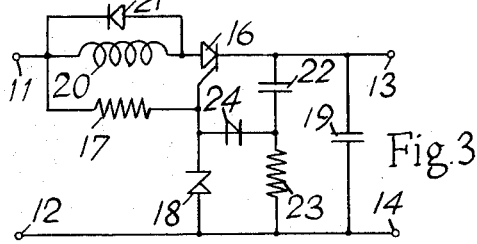
Figure 4:
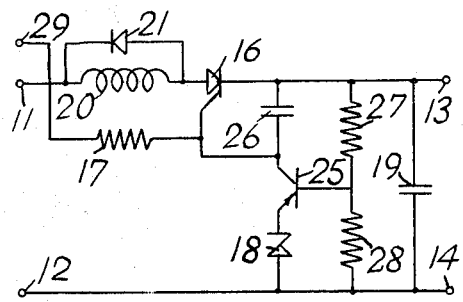
Figure 5:
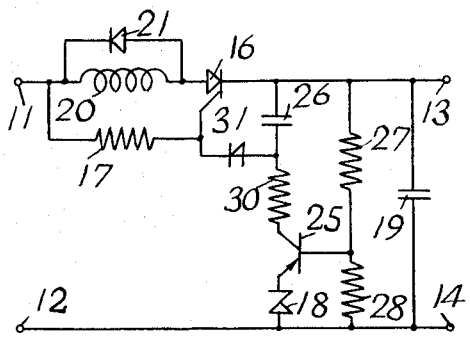
Figure 6:
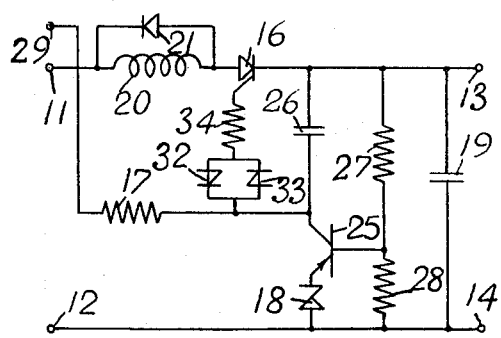

Further and more specific objectives will be apparent from the following description taken in connection with the accompanying drawings in which: FIGURE 1 illustrates a voltage stabilizing circuit according to one form of the invention, FIGURE 2 illustrates a second form of the same invention, FIGURE 3 is a circuit illustrating a modification of the circuit shown in FIGURE 2, FIGURE 4 illustrates a further modification of the circuit in FIGURE 2, FIGURE 5 illustrates a modification of the circuit shown in FIGURE 3, and FIGURE 6 illustrates a modification of the circuit of FIGURE 4.

Referring first to FIGURE 1, there are provided first and second terminals 11, 12 adapted for connection to an unstabilised D.C. source, so as to be of relatively positive and negative polarity in use respectively, and third and fourth terminals 13, 14 adapted for connection to a load, the terminals 12, 14 being interconnected.

The terminals 11, 13 are interconnected through a first resistor 15 in series with the anode and cathode of a switchable rectifier 16, the gate of the switchable rectifier being connected to the terminals 11, 12 through a second resistor 17 and a Zener diode 18 respectively. Moreover, the terminals 13, 14 are bridged by a capacitor 19.

The Zener diode 18 is chosen to conduct at the required output voltage. In operation, assuming that the capacitor 19 is discharged, when the unstabilised supply is connected current flows through the resistor 17 to switch on the switchable rectifier 16, whereafter current flows through the switchable rectifier to the load and to charge the capacitor 19. The voltage across the Zener diode 18 now rises until it breaks down and conducts. At this point the gate of the switchable rectifier 16 is held at a constant voltage but with further increase in the supply voltage the cathode of the switchable rectifier becomes increasingly positive, so that a point is quickly reached at which the gate is negative with respect to the cathode and the switchable rectifier is switched off. The capacitor 19 now discharges into the load, so that the cathode of the switchable rectifier becomes less positive. However, the voltage at the gate is still maintained by the Zener diode 18, so that the switchable rectifier is again switched on. This cycle is repeated with each rise in the unstabilised voltage, it being understood that the higher the unstabilised voltage the shorter will be the periods during which the switchable rectifier is conductive. The circuit produces an output stabilised to within a few volts of the breakdown voltage of the Zener diode 18.

The purpose of the resistor 15 is to limit the current flowing through the switchable rectifier to a safe value when the latter is on.

In the modified example shown in FIGURE 2, the resistor 15 is replaced by an inductor 20 having a diode 21 in parallel therewith. The inductor 20 limits the rate of rise of current, but does not waste power in the same way as the resistor 15 since energy is stored in the case of the inductor. The diode 21 provides the required conductive path when the switchable rectifier 16 is off.

In FIGURE 3, the second example is modified in that a second capacitor 22 and a third resistor 23 are connected in series across the terminals 13, 14 so as to be in parallel with the capacitor 19. A point intermediate the capacitor 22 and resistor 23 is connected through a four-layer diode 24 to a point intermediate the Zener diode 18 and the gate of the switchable rectifier 16.

In operation, the switchable rectifier 16 is switched on as in the first example, at which point the capacitor 22 is charged through the resistor 23 until the breakdown voltage of the four-layer diode 24 is reached, at which point a pulse is applied to the gate to switch off the switchable rectifier 16. If the Zener diode 18 is not conducting, the switchable rectifier will be switched on immediately the capacitor 22 has discharged, since at this point the four-layer diode 24 becomes non-conductive and current flows to the gate through the resistor 17. The discharge time of the capacitor 22 is chosen to be short so that when the required output voltage has not been attained the ratio between the on and off periods of the switchable rectifier is high. However, when the Zener diode 18 conducts, the switchable rectifier will not be switched on immediately the capacitor 22 has discharged, but will be switched on when the cathode voltage has fallen sufficiently, as in the first example.

It will be understood that the capacitor 22, resistor 23 and four-layer diode 24 constitute a pulse generator providing pulses for switching off the switchable rectifier, and thereby providing more accurate stabilisation than the first example.

FIGURE 4 illustrates a modification of FIGURE 2 in which the gate of the switchable rectifier is not connected to the terminal 12 through the Zener diode 18, but is connected to the collector of a n-p-n type transistor 25 the emitter of which is connected to the terminal 12 through the Zener diode 18. The collector of the transistor 25 is further connected to the cathode of the switchable rectifier 16 through a capacitor 26 whilst its base is connected to the terminals 13, 14 through resistors 27, 28 respectively. In this example the gate of the switchable rectifier is preferably not connected to the terminal 11 through the resistor 17, but is connected through the resistor 17 to a terminal 29 at a higher positive potential.

In operation, the switchable rectifier 16 is switched on only after the capacitor 26 is charged. The transistor 25 remains non-conductive until the required output voltage is reached, at which point the Zener diode 18 breaks down the transistor 25 conducts and the capacitor 26 is discharged and then charged to the opposite polarity. Gate current now flows to switch off the switchable rectifier 16.

In this example the frequency of operation of the circuit depends on the capacitor 26. The frequency is chosen to be sufficiently low to prevent excessive dissipation of energy. Moreover, other forms of transistor amplifier using one or more transistors may be substituted.

In FIGURE 5, FIGURE 4 has been modified in that the collector of the transistor 25 is connected to the cathode of the switchable rectifier 16 through a resistor 30 and the capacitor 26 in series, and is connected to the gate through the resistor 30 and a four-layer diode 31 in series. The terminal 29 is omitted. In this example the capacitor 26 only charges when the transistor 25 conducts, and the switchable rectifier 16 is switched off when the voltage across the capacitor 26 is sufficient to break down the four-layer diode 31. The switchable rectifier 16 is switched on again when the output voltage falls to a value such that the current flowing through the transistor 25 is insufficient to maintain the four-layer diode 31 conductive.

This circuit provides a larger current for switching off the switchable rectifier than in FIGURE 4.

In the example, shown in FIGURE 6, FIGURE 4 is modified in that the resistor 17 is connected between the terminal 29 and the cathode and anode respectively of a pair of oppositely-connected four-layer diodes 32, 33 in parallel. Moreover, the anode and cathode of the diodes 32, 33 respectively are connected to the gate through a resistor 34. As in FIGURE 4, a higher positive voltage is supplied to the terminal 29 than to the terminal 11, and the arrangement is such that to switch on the switchable rectifier 16 the capacitor 26 must first be charged through the resistor 17 to a voltage sufficient to break down one of the four-layer diodes 32, 33. The switchable rectifier is switched off as in the example described with reference to FIGURE 5.

This circuit provides fast-acting pulses for switching the switchable rectifier on and off, thereby minimising power dissipation.

In further modifications of FIGURES 2 to 6, instead of connecting the resistor 17 directly either to the terminal 11 or to the terminal 29, it may be connected to the terminal 11 through the inductor 20. Moreover, if desired an additional resistor may be connected between the collector of the transistor and the second terminal. Each of these modifications assist the switching off of the switchable rectifier.

Having thus described my invention what I claim as new and desire to secure by Letters Patent is:

1. A circuit for stabilising a D.C. voltage supply, comprising in combination first and second terminals connected to the unstabilised supply, a switchable rectifier, said switchable rectifier having an anode, a cathode and a gate, and being switched on by a positive voltage applied between its gate and cathode, and switched off by a negative voltage applied between its gate and cathode, means connecting the anode of the switchable rectifier to the first terminal, a capacitor connecting the cathode of the switchable rectifier to the second terminal, third and fourth terminals connected across the capacitor for connection to a load to be driven by the voltage supply, biasing means connected in circuit with the gate of said switchable rectifier and normally tending to render the switchable rectifier conductive, and means connected in circuit with the gate of said switchable rectifier and sensitive to the voltage across the third and fourth terminals for switching the switchable rectifier on and off to maintain the voltage across the third and fourth terminals substantially constant.

2. A circuit for stabilising a D.C. voltage supply, comprising in combination first and second terminals connected to the unstabilised supply, a switchable rectifier, said switchable rectifier having an anode, a cathode and a gate, and being switched on by a positive voltage applied between its gate and cathode, and switched off by a negative voltage applied between its gate and cathode, means connecting the anode of the switchable rectifier to the first terminal, a capacitor connecting the cathode of the switchable rectifier to the second terminal, third and fourth terminals connected across the capacitor for connection to a load to be driven by the voltage supply, biasing means in circuit with the gate of the switchable rectifier and tending to maintain said switchable rectifier conductive, and a Zener diode in circuit with the gate of the switchable rectifier, said Zener diode switching the switchable rectifier on and off to maintain the voltage across the third and fourth terminals substantially constant.

3. A circuit for stabilising a D.C. voltage supply, comprising in combination first and second terminals connected to the D.C. supply, a switchable rectifier, said switchable rectifier having an anode, a cathode and a gate, and being switched on by a positive voltage applied between its gate and cathode, and switched off by a negative voltage applied between its gate and cathode, a first resistor connecting the anode of the switchable rectifier to the first terminal, a capacitor connecting the cathode of the switchable rectifier to the second terminal, third and fourth terminals connected across the capacitor for connection to a load to be supplied by said voltage supply, a Zener diode connecting the gate of the switchable rectifier to the second terminal, and a resistor connecting the first terminal to the gate of the switchable rectifier, said Zener diode determining the on and off periods of the switchable rectifier to maintain the voltage across the third and fourth terminals substantially constant.

4. A circuit for stabilising a D.C. voltage supply, comprising in combination first and second terminals connected to the D.C. supply, a switchable rectifier, said switchable rectifier having an anode, a cathode and a gate, and being switched on by a positive voltage applied between its gate and cathode, and switched off by a negative voltage applied between its gate and cathode, an inductor through which the anode of the switchable rectifier is connected to the first terminal, a diode connected across said inductor, a capacitor connecting the cathode of the switchable rectifier to the second terminal, third and fourth terminals connected across the capacitor for connection to a load to be supplied by said voltage supply, a Zener diode connecting the gate of the switchable rectifier to the second terminal, and a resistor connecting the first terminal to the gate of the switchable rectifier, said Zener diode determining the on and off periods of the switchable rectifier to maintain the voltage across the third and fourth terminals substantially constant.

5. A circuit for stabilising a D.C. voltage supply, comprising in combination first and second terminals connected to the unstabilised supply, a switchable rectifier, said switchable rectifier having an anode, a cathode and a gate, and being switched on by a positive voltage applied between its gate and cathode, and switched off by a negative voltage applied between its gate and cathode, means connecting the anode of the switchable rectifier to the first terminal, a capacitor connecting the cathode of the switchable rectifier to the second terminal, third and fourth terminals connected to opposite sides of said capacitor for connection to a load to be driven by the voltage supply, biasing means in circuit with the gate of said switchable rectifier and tending to render the switchable rectifier conductive, a pulse generator connected across the third and fourth terminals for supplying pulses to the gate of the switchable rectifier intermittently to switch it off, and a Zener diode in circuit with the gate of the switchable rectifier, said Zener diode serving to delay switching on of the switchable rectifier by the biasing means after the switchable rectifier has been switched off by a pulse for a time dependent upon the voltage across the third and fourth terminals, thereby maintaining the voltage across the third and fourth terminals substantially constant.

6. A circuit for stabilising a D.C. voltage supply, comprising in combination first and second terminals connected to the unstabilised supply, a switchable rectifier, said switchable rectifier having an anode, a cathode and a gate, and being switched on by a positive voltage applied between its gate and cathode, and switched off by a negative voltage applied between its gate and cathode, an inductor connecting the anode of the switchable rectifier to the first terminal, a diode connected across said inductor, a first capacitor connecting the cathode of the switchable rectifier to the second terminal, third and fourth terminals connected to opposite sides of said capacitor for connection to a load to be fed by said voltage supply, a second capacitor and a first resistor connected in series across the third and fourth terminals, a four layer diode connecting a point intermediate the second capacitor and first resistor to the gate of the switchable rectifier, a second resistor connecting the gate of the switchable rectifier to the first terminal, and a Zener diode connecting the gate of the switchable rectifier to the second terminal, the second capacitor, first resistor and four layer diode constituting a pulse generator for intermittently supplying pulses to the switchable rectifier to switch it off, and said Zener diode delaying switching on of the switchable rectifier by current flowing through the second resistor for a time dependent upon the output voltage across the third and fourth terminals, so that the output voltage across the third and fourth terminals is maintained substantially constant.

7. A circuit as claimed in claim 2 including a transistor amplifier in circuit with the gate of the switchable rectifier between the gate and the Zener diode.

8. A circuit for stabilising a D.C. voltage supply, comprising in combination first and second terminals connected to the unstabilised supply, a switchable rectifier, said switchable rectifier having an anode, a cathode and a gate, and being switched on by a positive voltage applied between its gate and cathode, and switched off by a negative voltage applied between its gate and cathode, an inductor through which the anode of the switchable rectifier is connected to the first terminal, a diode connected across an inductor, a first capacitor through which the cathode of the switchable rectifier is connected to the second terminal, third and fourth terminals for connection to a supply to be fed by said D.C. voltage and connected to opposite sides of the first capacitor, biasing means in circuit with the gate of the switchable rectifier and tending to render the switchable rectifier conductive, a resistance chain connected across the third and fourth terminals, a transistor having its base connected to a point on said resistance chain, a Zener diode through which the emitter of the transistor is connected to the second terminal, a capacitor through which the collector of the transistor is connected to the third terminal, the collector of the transistor being further connected to the gate of the switchable rectifier, the switchable rectifier being switched on and off to maintain the voltage across the third and fourth terminals substantially constant.

9. A circuit as claimed in claim 8 in which said biasing means comprises a fifth terminal connected to a D.C. source of polarity such as to render the switchable rectifier conductive, and a resistor connecting the gate of the switchable rectifier to the fifth terminal.

10. A circuit as claimed in claim 8 including a resistor connected between the collector of the transistor and the second capacitor, and a four layer diode through which a point intermediate the resistor and second capacitor is connected to the gate of the switchable rectifier.

11. A circuit as claimed in claim 10 in which said biasing means comprises a resistor connecting the gate of the switchable rectifier to the first terminal.

12. A circuit as claimed in claim 8 including a resistor having one end connected to the gate of the switchable rectifier, and a pair of oppositely connected four layer diodes in parallel between the other end of said resistor and the collector of the transistor.

13. A circuit as claimed in claim 12 in which said biasing means comprises a fifth terminal connected to a D.C. source of polarity such as to render the switchable rectifier conductive, and a resistor connected between said fifth terminal and the collector of the transistor.

References Cited by the Examiner
UNITED STATES PATENTS

| | | | |
|---|---|---|---|
| 2,776,382 | 1/1957 | Jensen | 323—22 X |
| 2,969,498 | 1/1961 | Stenudd | 323—22 |
| 3,105,170 | 9/1963 | Palmer | 315—183 |

OTHER REFERENCES

Solid State Products, Inc., Bulletin D410-02, 3-60, pages 4 and 5 relied on.

LLOYD McCOLLUM, *Primary Examiner.*

K. HADLAND, H. B. KATZ, *Assistant Examiners.*